US010166873B2

(12) United States Patent
Kardolus et al.

(10) Patent No.: US 10,166,873 B2
(45) Date of Patent: Jan. 1, 2019

(54) BATTERY CHARGER FOR ELECTRIC VEHICLES

(71) Applicant: ABB B.V., Rotterdam (NL)

(72) Inventors: Menno Kardolus, DL Duivendrecht (NL); Jos Schijffelen, AR Breda (NL); Mark Gröninger, AV Venlo (NL); Dolf Van Casteren, KK Eindhoven (NL)

(73) Assignee: ABB B.V., Rotterdam (NL)

( * ) Notice: Subject to any disclaimer, the term of this patent is extended or adjusted under 35 U.S.C. 154(b) by 940 days.

(21) Appl. No.: 13/945,525

(22) Filed: Jul. 18, 2013

(65) Prior Publication Data

US 2013/0314038 A1 Nov. 28, 2013

Related U.S. Application Data

(63) Continuation of application No. PCT/EP2012/050813, filed on Jan. 19, 2012.

(30) Foreign Application Priority Data

Jan. 19, 2011 (EP) .................................. 11151395

(51) Int. Cl.
*H02J 7/00* (2006.01)
*H02J 7/02* (2016.01)
(Continued)

(52) U.S. Cl.
CPC ............. *B60L 11/1811* (2013.01); *B60L 3/00* (2013.01); *B60L 11/182* (2013.01); *B60L 11/1812* (2013.01); *H02J 1/108* (2013.01); *H02J 7/022* (2013.01); *H02M 7/23* (2013.01); *B60L 2210/30* (2013.01); *H02M 2001/0048* (2013.01); *Y02T 10/7005* (2013.01); *Y02T 10/7072* (2013.01);
(Continued)

(58) Field of Classification Search
CPC ............................. H02J 7/022; B60L 11/1811
See application file for complete search history.

(56) References Cited

U.S. PATENT DOCUMENTS 5,200,887 A    4/1993 Ioroi et al.
5,319,536 A *  6/1994 Malik ..................... H02J 1/102
                                                    307/82
(Continued)

FOREIGN PATENT DOCUMENTS

EP       0 595 091 A2    5/1994
EP       2 218 607 A1    8/2010
WO       WO 2010/086788 A2  8/2010

OTHER PUBLICATIONS

Colack, I.; Tuncay, N: "High current, low voltage modular power converter for lead acid battery charging", Sustainable Energy Technologies, 2008. ICSET 2008. IEEE International Conference on, Nov. 24, 2008 (Nov. 24, 2008).*

(Continued)

Primary Examiner — David V Henze-Gongola
Assistant Examiner — Tarikh Rankine
(74) Attorney, Agent, or Firm — J. Bruce Schelkopf; Taft Stettinius & Hollister LLP

(57) ABSTRACT

A battery charger for electric vehicles includes at least three identical current controlled AC-DC converter modules having reverse current protected outputs connected in parallel to a charge terminal of the battery.

22 Claims, 12 Drawing Sheets

(51) Int. Cl.
*H02M 3/24* (2006.01)
*B60L 11/18* (2006.01)
*H02J 1/10* (2006.01)
*H02M 7/23* (2006.01)
*B60L 3/00* (2006.01)
*H02M 1/00* (2006.01)

(52) U.S. Cl.
CPC ............ *Y02T 10/7241* (2013.01); *Y02T 10/92* (2013.01); *Y02T 90/122* (2013.01); *Y02T 90/127* (2013.01); *Y02T 90/14* (2013.01); *Y10T 307/266* (2015.04); *Y10T 307/273* (2015.04); *Y10T 307/707* (2015.04)

(56) References Cited

U.S. PATENT DOCUMENTS

| | | | |
|---|---|---|---|
| 5,321,600 | A | 6/1994 | Fierheller |
| 5,341,083 | A | 8/1994 | Klontz et al. |
| 5,499,178 | A * | 3/1996 | Mohan ............... H02J 3/01 307/105 |
| 5,668,707 | A * | 9/1997 | Barrett ............... H02J 1/102 363/44 |
| 5,831,409 | A * | 11/1998 | Lindberg ............... B60L 1/003 180/65.8 |
| 5,894,414 | A * | 4/1999 | Jiang ............... H02M 1/4216 363/65 |
| 6,225,776 | B1 * | 5/2001 | Chai ............... B60L 3/0069 320/109 |
| 7,313,004 | B1 | 12/2007 | Yang et al. |
| 8,184,456 | B1 | 5/2012 | Jain et al. |
| 2002/0057582 | A1 * | 5/2002 | Nakayama ............ B60K 6/445 363/17 |
| 2005/0036248 | A1 * | 2/2005 | Klikic ............... H02J 9/062 361/42 |
| 2007/0274113 | A1 * | 11/2007 | Wang ............... H02M 1/10 363/109 |
| 2008/0130324 | A1 | 6/2008 | Choi et al. |
| 2008/0302505 | A1 * | 12/2008 | Kato ............... F25B 23/006 165/61 |
| 2008/0310194 | A1 | 12/2008 | Huang et al. |
| 2009/0091955 | A1 | 4/2009 | Choi et al. |
| 2010/0001581 | A1 | 1/2010 | Broesse et al. |
| 2010/0020569 | A1 | 1/2010 | Melanson et al. |
| 2010/0091529 | A1 * | 4/2010 | Jakeman ............... H02J 1/00 363/36 |
| 2010/0220501 | A1 | 9/2010 | Krause |
| 2010/0225274 | A1 | 9/2010 | Fujitake |
| 2010/0231164 | A1 * | 9/2010 | Yang ............... B60L 11/1816 320/109 |
| 2011/0050174 | A1 * | 3/2011 | King ............... B60L 11/1811 320/134 |
| 2011/0261591 | A1 | 10/2011 | Krause |

OTHER PUBLICATIONS

Notification Concerning Transmittal of International Preliminary Report on Patentability (Forms PCT/IB/326 and PCT/IB/373) and the Written Opinion of the International Searching Authority (Form PCT/ISA 237) dated Aug. 1, 2013, issued in corresponding International Application No. PCT/EP2012/050813. (9 pgs.).

International Search Report (PCT/ISA/210) dated Mar. 4, 2013, by the European Patent Office as the International Searching Authority for International Application No. PCT/EP2012/050813.

Written Opinion (PCT/ISA/237) dated Mar. 4, 2013, by the European Patent Office as the International Searching Authority for International Application No. PCT/EP2012/050813.

Search Report dated Jul. 28, 2011, by the European Patent Office for Application No. 11151395.8.

Kim et al., "A New Zero Voltage Switching High Frequency Dc-to-dc Converter", Dept. of Electrical Engineering, Korea Advanced Institute of Science and Technology (KAIST), Aug. 1991, pp. 217-221.

Sumiyoshi et al., "High-Frequency Transformer Isolated Soft-Switching DC-DC Converter for Fuel Cell Cogeneration System", Power Electronics and Motion Control Conference, IEEE, Aug. 2006, pp. 746-748.

Huber et al., "Effect of Valley Switching and Switching-Frequency Limitation on Line-Current Distortions of DCM/CCM Boundary Boost PFC Converters", IEEE Transactions on Power Electronics, Feb. 2009, pp. 339-347, vol. 24, No. 2.

Ridley et al., "Design and control of a full-wave, quasi-resonant flyback converter", Virginia Power Electronics Center, Virginia Polytechnic Institute and State University, Feb. 1988, pp. 41-49.

International Search Report (PCT/ISA/210) dated Jun. 8, 2012, by the European Patent Office as the International Searching Authority for International Application No. PCT/EP2012/050811.

Written Opinion (PCT/ISA/237) dated Jun. 8, 2012, by the European Patent Office as the International Searching Authority for International Application No. PCT/EP2012/050811.

Search Report dated Jun. 14, 2011, by the European Patent Office for Application No. 11151382.6.

Colak et al., "High current, low voltage modular power converter for lead acid battery charging", Sustainable Energy Technologies, IEEE, Nov. 2008, pp. 1042-1046.

Pothana et al., "Parallel Operation of Power Factor Corrected AC-DC Converter Modules With Two Power Stages", Power Electronics and Drive Systems, Nov. 2007, pp. 953-960.

Egan et al., "Corrected Single-Stage Inductive Charger for Electric Vehicle Batteries", Industrial Electronics, IEEE Transaction, Apr. 2007, pp. 1217-1226, vol. 54, No. 2.

* cited by examiner

BATTERY CHARGER FOR ELECTRIC VEHICLES

RELATED APPLICATIONS

This application claims priority as a continuation application under 35 U.S.C. § 120 to PCT/EP2012/050813, which was filed as an International Application on Jan. 19, 2012 designating the U.S., and which claims priority to European Application 11151395.8 filed in Europe on Jan. 19, 2011. The entire contents of these applications are hereby incorporated by reference in their entireties.

FIELD

The present disclosure relates to a battery charger for electric vehicles.

BACKGROUND INFORMATION

Known battery chargers for electric vehicles can be either configured as on-board chargers adapted to be built in on board of the vehicle or as stationary fast chargers installed in a power station. On-board chargers can be plugged to a single phase 230V-16 A mains power socket at the home of the user so that the battery may be charged overnight with a charging power in the order of magnitude of 3.5 kW. Fast chargers may be powered by a 3-phase 400 V-40 A mains source and may have a charging power of several tens of kW so as to charge the battery to 80-100% of its full capacity in a time of 10 to 30 min. They require a car connection, for example, according to the specifications of the CHAdeMo standard for electric cars.

Both types of battery chargers require the use of high quality electronic components that can withstand high voltages and high currents and are therefore relatively expensive.

SUMMARY

An exemplary embodiment of the present disclosure provides a battery charger for electric vehicles. The exemplary battery charger includes at least three identical current controlled AC-DC converter modules having reverse current protected outputs connected in parallel to a charge terminal of a vehicle battery.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Figure 1:
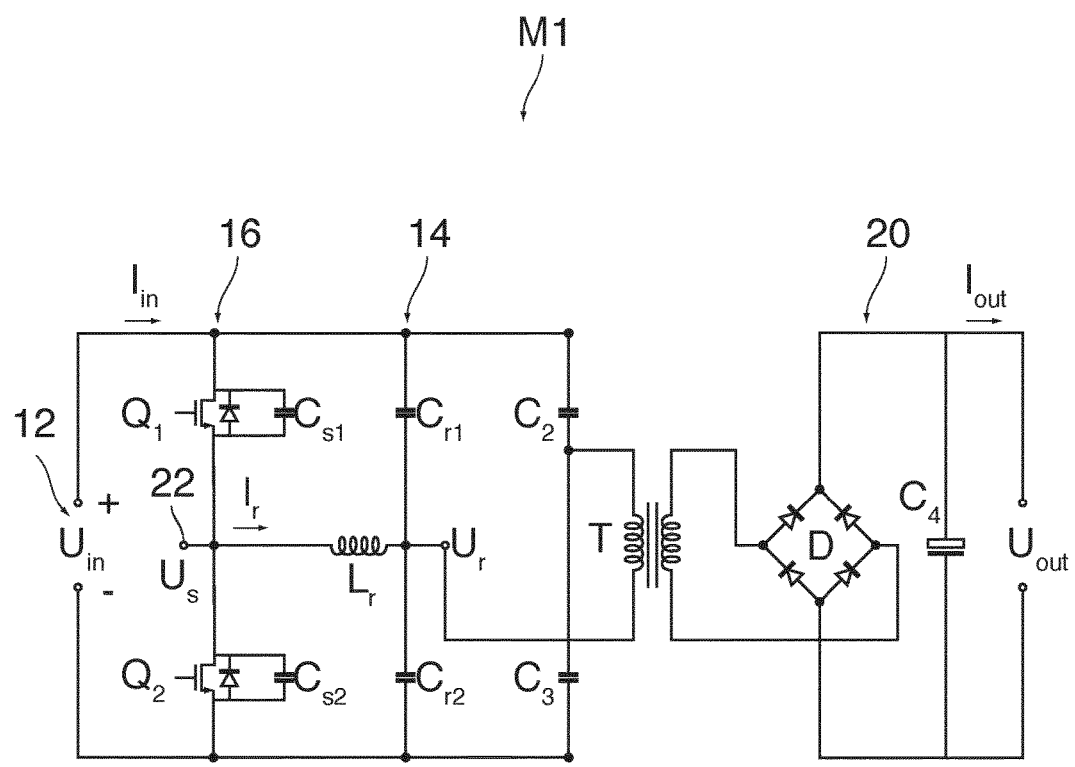
FIG. 1 is a circuit diagram of a power converter module according to an exemplary embodiment of the present disclosure.
Figure 2:
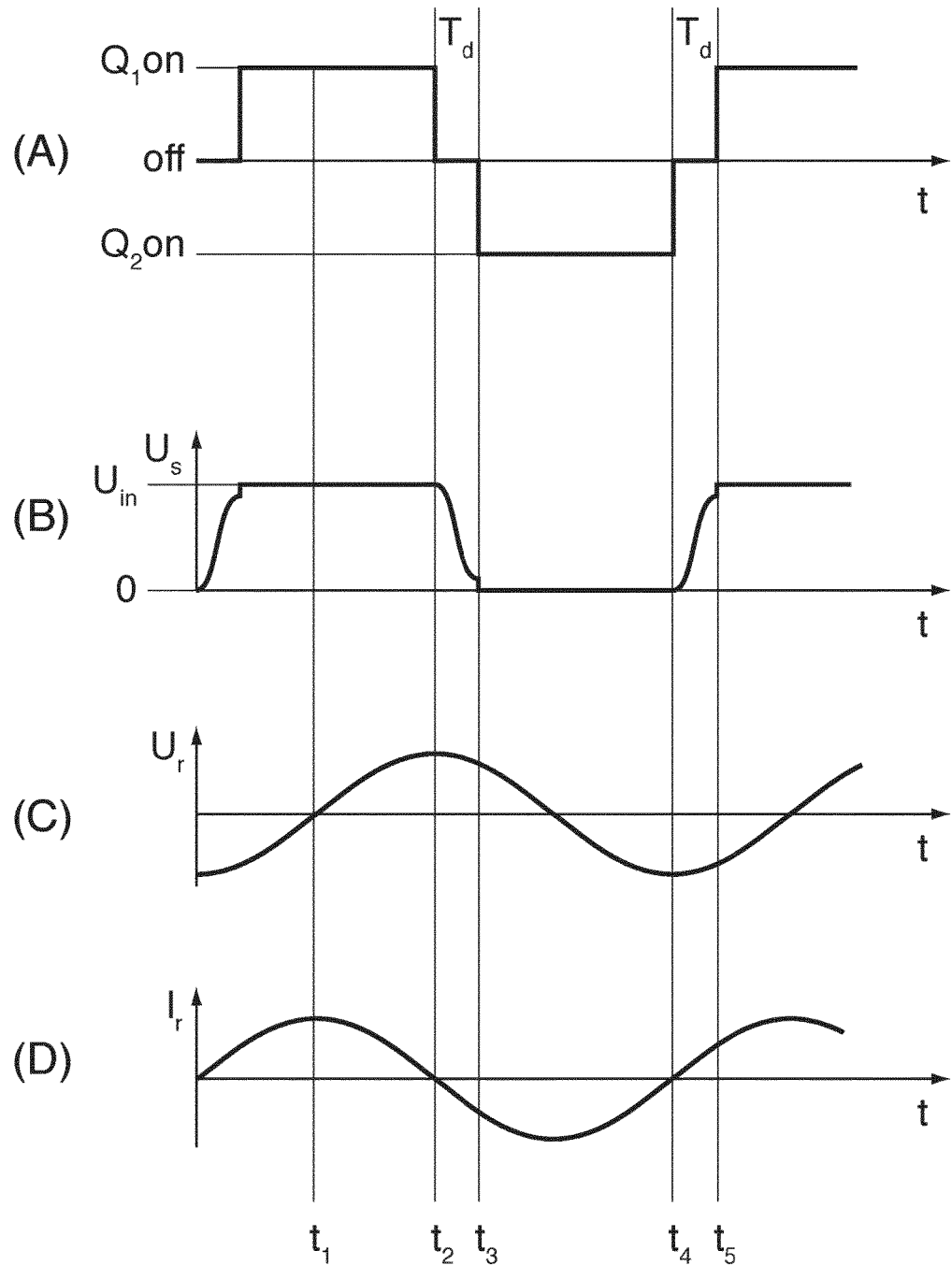
FIGS. 2(A)-(D) show waveforms for explaining the function of the power converter module shown in FIG. 1.
Figure 3:
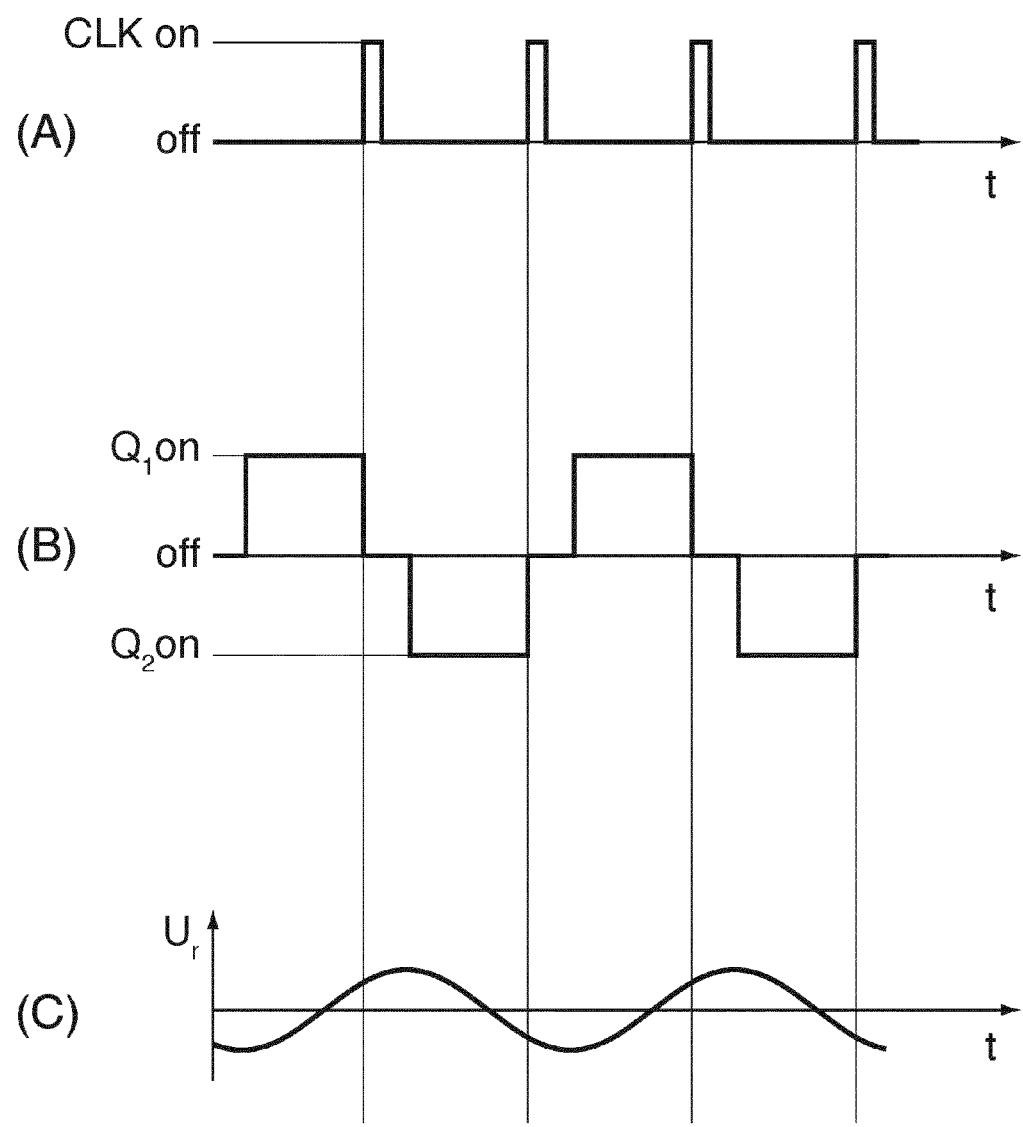
FIGS. 3(A)-(C) show waveforms illustrating a mode of operation with reduced output current.

Exemplary embodiments of the present disclosure provide a reliable battery charger that can be manufactured at low costs.

In accordance with an exemplary embodiment, the battery charger according to the present disclosure is composed of at least three identical current controlled AC-DC converter modules having reverse current protected outputs connected in parallel to a charge terminal of the battery.

Since the converter modules can be current controlled while the output voltages of all modules can be determined by the battery voltage and are thus equal, it is possible to connect the outputs together, so that the charge current into the battery will be the sum of the currents provided by the individual modules. Thus, the modules may be designed for lower peak currents, so that less expensive components may be used. Since each charger is composed of a plurality of modules, mass production of the modules leads to further cost reductions. The output of each module is protected, for example, by a diode, so that destructive reverse currents can reliably be avoided in case of a failure of one of the modules.

More specific optional features of the present disclosure are described with reference to the exemplary embodiments.

In accordance with an exemplary embodiment, modules which have an identical basic layout are used for both on-board chargers and fast chargers, the higher power of the fast charger being achieved by combining a larger number of modules.

In accordance with an exemplary embodiment, even the on-board charger has a modular construction and is composed of three modules. These three modules may be connected in parallel to a 230 V single phase AC voltage but may also be connected to a three-phase voltage source. In the latter case, the input sides of the modules will be connected to the three phases in a triangle configuration, so that each module will be driven by a 400 V AC voltage. On the one hand, this permits to operate the on-board charger with higher power and, consequently, to shorten the battery charge time when a three-phase power source is available in the household. On the other hand, a plurality of such units, which are each formed by three modules, may be combined to form a stationary fast charger powered from a 3-phase source.

In accordance with an exemplary embodiment, the converter modules are formed by resonant converters whose output current may be controlled over a large control range by varying the switching frequency and/or the switching pattern of switches which excite the resonance circuit of the converter.

Since the efficiency of a resonant converter is highest when it is operated close to the resonance frequency, for example, at maximum power, the output current may be roughly adapted to the demand by varying the number of active modules of the charger, and fine-tuning of the output current to the demand is achieved by operating only one of the modules at reduced power whereas all the other active modules are operated at full power.

In case that one of the modules should fail, it is possible to generate a signal that indicates the still available power of the remaining modules to a battery controller that controls the charge process of the battery, so that the charge process may be continued with reduced power.

At first, referring to FIGS. 1 to 6, an example of a resonant converter will be described which may be used as a converter module M1 in a battery charger according to the disclosure.

As is shown in FIG. 1, the resonant converter module M1 is arranged to convert an input voltage $U_{in}$ into a DC output voltage $U_{out}$ which will be equal to the battery voltage. The input voltage $U_{in}$ is a DC voltage or a pulsating DC voltage supplied by a voltage source 12.

A resonant tank 14 is formed by an inductor $L_r$ and two capacitors $C_{r1}$ and $C_{r2}$, and is connected to the voltage source 12 via a half bridge 16 formed by switches $Q_1$ and $Q_2$. The switches $Q_1$ and $Q_2$ are electronic switches, for example, IGBTs. The gates of these switches are connected to an electronic module controller 18 (FIG. 4) that will be described later. A snubber capacitor $C_{s1}$, $C_{s2}$ is connected in parallel to each of the switches $Q_1$ and $Q_2$.

The switches are alternatingly opened and closed at a switching frequency in the order of magnitude from 25 kHz to 50 kHz so as to cause the resonance tank 14, which may have a resonance frequency of 25 kHz, for example, to oscillate. The capacitance components of the resonance tank 14 are formed by the capacitors $C_{r1}$ and $C_{r2}$ which are arranged symmetrically with respect to the inductor $L_r$, just as the switches $Q_1$ and $Q_2$. The capacitor $C_{r1}$ is connected between the plus pole of the voltage source 12 and the inductor $L_r$, and the capacitor $C_{r2}$ is connected between the inductor $L_r$ and the minus pole of the voltage source.

Two capacitors $C_2$ and $C_3$ with equal capacity are connected in series between the plus and minus poles of the voltage source 12, in parallel with the resonance tank 14. When the resonance tank oscillates, a voltage $U_r$ at the point connecting the inductor $L_r$ to the capacitors $C_2$ and $C_3$ will oscillate around a center voltage that is defined by the mid-point between the capacitors $C_2$ and $C_3$. The voltage $U_r$ drives the primary side of a transformer T whose secondary side is connected to a rectifier 20 formed by a diode full bridge D and capacitor $C_4$. The voltage drop across the capacitor $C_4$ forms the output voltage $U_{out}$. When a load (battery) is connected, a discharge circuit for the capacitor $C_4$ is closed, and an output current $I_{out}$ may flow to charge the battery.

When the switch $Q_1$ is ON while the switch $Q_2$ is OFF, an input current will flow through the switch $Q_1$ and the inductor $L_r$ to charge the capacitor $C_{r2}$. As long as the voltage drop across the inductor $L_r$ is positive ($U_{in}$>$U_r$), a current $I_r$ in the resonance tank 14 will increase, and the capacitor $C_{r1}$ will be discharged. When capacitor $C_{r1}$ has been discharged completely, the inductor $L_r$ will cause the current $I_r$ to continue, so that capacitor $C_{r2}$ will be charged further and capacitor $C_{r1}$ will be charged with opposite polarity. The voltage drop across inductor $L_r$ becomes negative and the current $I_r$ decreases. Eventually, the current $I_r$ will change sign. Then, the switch $Q_1$ is switched OFF and switch $Q_2$ is switched ON, so that the capacitors $C_{r1}$ and $C_{r2}$ will be discharged via the inductor $L_r$ and the switch $Q_2$. The current will increase until the capacitor $C_{r2}$ is discharged, and then the current will gradually drop to zero while the voltage $U_r$ becomes negative relative to the minus pole of the voltage source 12. Then, the switch $Q_2$ will be switched off and switch $Q_1$ will be switched ON again, so that another cycle may start. In this way, a primary current in the transformer T is kept oscillating. When the switching frequency of the switches $Q_1$ and $Q_2$ is close to the resonance frequency of the resonance tank 14, a maximum of power will be transferred.

In order to prevent the voltage source 12 from being short-circuited via the switches $Q_1$ and $Q_2$, the ON periods of these switches are to be separated by a certain minimum dead time. During these dead times, currents that would otherwise flow through the switches will be diverted into the snubber capacitors $C_{s1}$, $C_{s2}$ and, to a smaller part, into the device capacitances of the IGBTs.

FIG. 2(A) illustrates the sequence of ON and OFF periods of the switches $Q_1$ and $Q_2$. In this example, the ON periods are separated by dead times $T_d$ which, for reasons that will become clear below, are larger than the minimum dead time mentioned above.

FIG. 2(B) illustrates a waveform of a voltage $U_s$ that is sensed by a voltage sensor 22 (FIG. 1) at the junction point between the two switches $Q_1$ and $Q_2$. Thus, the voltage $U_s$ corresponds to the voltage drop across the switch $Q_2$ whereas $U_{in}$-$U_s$ represents the voltage drop across the switch $Q_1$. As a consequence of the symmetry of the circuit shown in FIG. 1, the waveform of the voltage $U_s$ shown in FIG. 2(B) is point-symmetric.

FIG. 2(C) shows the voltage $U_r$ of the resonance tank. In resonance, this voltage is delayed by 90° relative to the voltage $U_s$.

FIG. 2(D) shows the current $I_r$ in the resonance tank. This current is 90° ahead of the voltage $U_r$ and is thus at least approximately in phase with the (non-sinusoidal) waveform of the voltage $U_s$.

At the time $t_1$ in FIGS. 2(A)-(D), the switch $Q_1$ is ON, while the switch $Q_2$ is OFF. The current $I_r$ is supplied by the closed switch $Q_1$, and the voltage $U_r$ increases. At the time $t_2$, the voltage $U_r$ has reached its maximum and, accordingly, the current $I_r$ crosses zero. At this instant, the switch $Q_1$ is switched OFF. This zero current switching of the switch $Q_1$ has the advantage that the detrimental effects of tail currents in the IGBT switch $Q_1$ are largely avoided.

The voltage $U_s$ which had been clamped to $U_{in}$ is now allowed to drop, as shown in FIG. 2(B). If the junction point between the switches $Q_1$ and $Q_2$ were not connected to the resonance tank 14, the series connection of capacitors $C_{s1}$ and $C_{s2}$ would reach an equilibrium, and $U_s$ would drop to $U_{in}/2$. However, the snubber capacitors $C_{s1}$ and $C_{s2}$ form another oscillating circuit with the inductor $L_r$, and this oscillating circuit tends to discharge $C_{s2}$ further. Ideally, $U_s$ would therefore drop to zero.

In order to reduce switching losses, the dead time $T_d$ should be selected such that the switch $Q_2$ is switched ON in the very moment when $U_s$ reaches zero because, then, no energy that has been stored in the capacitor $C_{s2}$ would be dissipated when this capacitor is short-circuited. In practice, however, $U_s$ may not always reach exactly zero, because the oscillating circuit is subject to external influences such as fluctuations of the input voltage $U_{in}$ and changes of the load conditions. This is why the desirable zero voltage switching cannot always be achieved. What can be achieved, however, is a so-called valley switching, i.e. the switch $Q_2$ is switched ON when $U_s$ (the absolute value thereof) reaches a minimum. The exact timing $t_3$ when this condition is fulfilled will also depend upon the external influences mentioned above and may therefore vary for varying operating conditions of the converter.

At the time $t_4$, the switch $Q_2$ will be switched OFF again (zero current switching at resonance), and the discharge process of the capacitor $C_{s1}$ between $t_4$ and $t_5$ is the mirror image of the process between $t_2$ and $t_3$. At $t_5$, the switch $Q_1$ is switched ON again (valley switching for $Q_1$) and another cycle will start.

In this converter module, the module controller 18 (FIG. 4) is configured to determine the ON switching timings $t_3$ and $t_5$ on the basis of the actual value of the voltage $U_s$ as measured by the voltage sensor 22, so that the ZVS condition or at least the valley switching condition can be fulfilled even under varying operating conditions of the converter.

In the example that is described here, the switching frequency of the switches $Q_1$ and $Q_2$ is varied in order to comply with varying demands for output current $I_{out}$. For example, the switching frequency may vary in an a range between 25 kHz and 50 kHz.

FIGS. 3(A)-(C) show waveforms for a mode of operation in which the converter operates above resonance. Since the dead times $T_d$ are determined by the valley switching condition, an increase of the switching frequency means that the duty cycle of the ON periods of the switches $Q_1$ and $Q_2$ becomes shorter, as can be seen by comparing FIG. 3(B) to FIG. 2(A). The switching frequency is determined by a clock signal CLK whose waveform is shown in FIG. 3(A). The timings of the clock pulses correspond to the OFF switching timings $t_2$ and $t_4$ in FIG. 2, i.e. the clock pulses alternatingly trigger the OFF switching operations of the switches $Q_1$ and $Q_2$. The ON-switching operations will then be determined by the valley switching criterion.

FIG. 3(C) shows the voltage $U_r$ of the resonance tank for the off-resonance mode. Since the switching frequency is higher than the resonance frequency, the phase delay of the voltage $U_r$ is larger than 90°, and the amplitude is smaller, so that less power is transferred to the output side. The shortened duty cycles of the switches $Q_1$ and $Q_2$ will also contribute to the reduced power transfer (and also to a decrease of the input current $I_{in}$).

The module controller 18 will now be described in greater detail by reference to FIG. 4.

In this example, the voltage source 12 is formed by a power supply having a diode full bridge 12a for rectifying an AC grid voltage $U_{grid}$. To achieve a high power factor on the input side, the converter has power factor correction functionality. Accordingly, the input (filter) capacitance is selected as small as possible. Thus, in this example, the input voltage $U_{in}$ for the converter module M1 has a waveform composed of sinusoidal positive half waves.

The converter module M1 is current controlled, i.e. the output current $I_{out}$ is controlled to a given target value designated by a demand signal $I_{out\ setpoint}$ that is supplied to the module controller 18. The actual output current $I_{out}$ is measured by a current sensor 24 and is delivered to the module controller 18 as a feedback signal.

A main unit 26 of the module controller 18 compares the output current $I_{out}$ to the demand signal $I_{out\ setpoint}$ and generates a command signal Cmd that is supplied to a multiplier 28. A voltage sensor 30 detects the input voltage $U_{in}$ and sends a signal representing this input voltage to another input of the multiplier 28. The product of the command signal Cmd and the input voltage $U_{in}$ is supplied to a sub-unit 32 of the module controller 18 as a reference signal $I_{in\ ref}$. The sub-unit 32 compares this reference signal to the input current $I_{in}$ that is detected by a current sensor 34. As a comparison result, the sub-unit 32 outputs a frequency signal f to a clock generator 36. This clock generator further receives a synchronizing signal sync that is derived from the input voltage $U_{in}$ and generates the clock signal CLK with the frequency f and synchronized with the pulsating input voltage $U_{in}$ and, indirectly, with the grid voltage $U_{grid}$.

The clock signal CLK is supplied to a switch controller 38 which further receives the voltage $U_s$ as sensed by the voltage sensor 22 and controls the gates of the switches $Q_1$ and $Q_2$. For example, the switch controller 38 may determine the ON-timings by monitoring both, the absolute value and the time derivative of $U_s$. Thus, in a normal mode of operation, the switch controller 38 controls the OFF-timings of the switches $Q_1$ and $Q_2$ on the basis of the clock signal CLK and the ON timings of the switches on the basis of the sensed voltage $U_s$. The synchronisation of the clock signal CLK with the grid voltage has the advantage that undesirable interferences between the switching frequency and the grid frequency (50 Hz) are avoided and EMI is reduced.

The frequency of the clock signal CLK is varied in order to control both, the output current $I_{out}$ and the input current $I_{in}$. In an inner feedback loop including the sub-unit 32, the input current $I_{in}$ is controlled so as to preserve the sinusoidal waveform of the input current (power factor correction). The frequency of the clock signal CLK is controlled as to cause the input current $I_{in}$ to follow the reference value $I_{in\ ref}$ which is the product of $U_{in}$ and the constant (or slowly varying) command signal Cmd, so that $I_{in}$ is forced to be in phase with and to have the same sinusoidal half waves as $U_{in}$.

The amplitude of the half waves of $I_{in}$ is determined by the command signal Cmd which is varied in an outer feedback loop including the main unit 26 and causing the output current $I_{out}$ to follow the demand as specified by the demand signal $I_{out\ setpoint}$.

The switch controller 38 has different modes of operation selectable by means of a mode signal Mod delivered by the main unit 26. For example, since the clock signal CLK determines only the OFF timings of the switches $Q_1$ and $Q_2$ and the ON timings are determined by the valley switching criterion, it is clear that a start mode should be provided for delivering the first or the first few ON pulses to the switches $Q_1$ and $Q_2$ until the converter has started to resonate and a meaningful voltage $U_s$ can be derived. In accordance with an exemplary embodiment, valley switching is only allowed in a pre-defined time window. If valley switching fails, outside the normal operation conditions, the switches are forced to switch on.

When the demand represented by $I_{out\ setpoint}$ decreases, the switching frequency f may be increased so as to reduce the output current $I_{out}$ accordingly. However, when the setpoint is decreased further, a point will be reached where the switching frequency must be so high that even with the converter that is proposed here the residual switching losses would become predominant. This is why the switch controller 38 has additional modes of operation which permit to reduce the output current even beyond this point.

Figure 5:
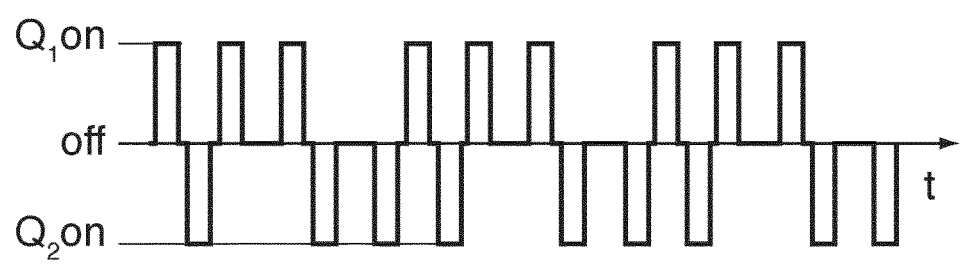
FIGS. 5 and 6 show waveforms illustrating different modes of operation of the converter module.

FIG. 5 illustrates, on a reduced time scale, the sequence of ON and OFF pulses of the switches $Q_1$ and $Q_2$ for a mode of operation in which the power transfer is reduced by periodically skipping isolated ones of the ON pulses of both switches. In the example shown, one out of four ON-pulses of both switches is skipped, so that the power transfer will be reduced by 25%. The timings at which the ON-pulses of the two switches are skipped are offset relative to one another, which helps the resonance tank to stay in the resonant mode. Although random pulse skipping would be possible, it is conceived to use pre-defined regular pulse skipping patterns in order avoid random pulse cancellation and sub-harmonic output current variations.

Figure 6:
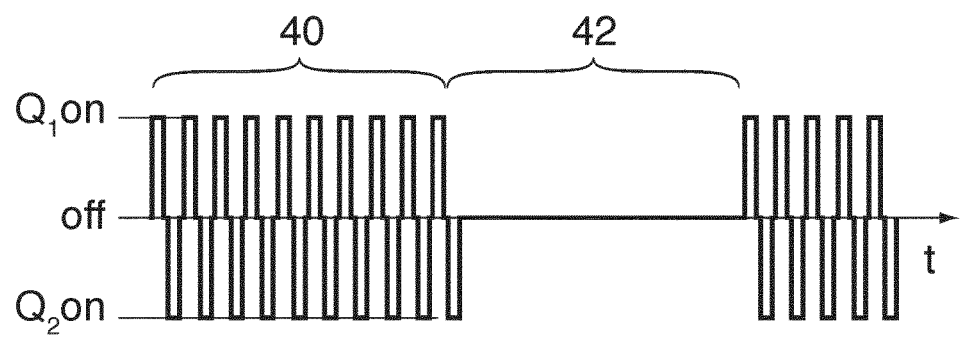

FIG. 6 illustrates, on an even further reduced time scale, a mode of operation, wherein the sequence of ON pulses of both switches is chopped into bursts 40 that are separated by breaks 42. In practice, the number of pulses per burst will be significantly larger than shown in FIG. 6, large enough for the resonance tank to tune-in, and the breaks 42 may be so large that the resonance oscillations may decay until the next burst begins. In this way, the power transfer may be reduced to 50% or even less. Yet, given that the switching frequency may be as high as 50 kHz, the repeat frequency of the bursts 40 may be so large that the resulting ripple in the output current will be negligible.

Of course, it is also possible to combine the pulse skipping mode of FIG. 5 with the burst mode of FIG. 6 in order to reduce the power transfer even further. Moreover it is possible to vary the ratio between the skipped and the non-skipped pulses in the pulse skip mode and/or to vary the ratio between the length of the bursts and the length of the breaks in the burst mode, and all this may additionally be combined with frequency control. For example, when switching from one mode to another, the converter frequency may be set to a pre-defined value, based on a frequency table or a suitable algorithm, so as to prevent a momentary step in the output current during the transition.

An exemplary embodiment of a battery charger will now be described by reference to FIGS. 7 to 10.

Figure 7:
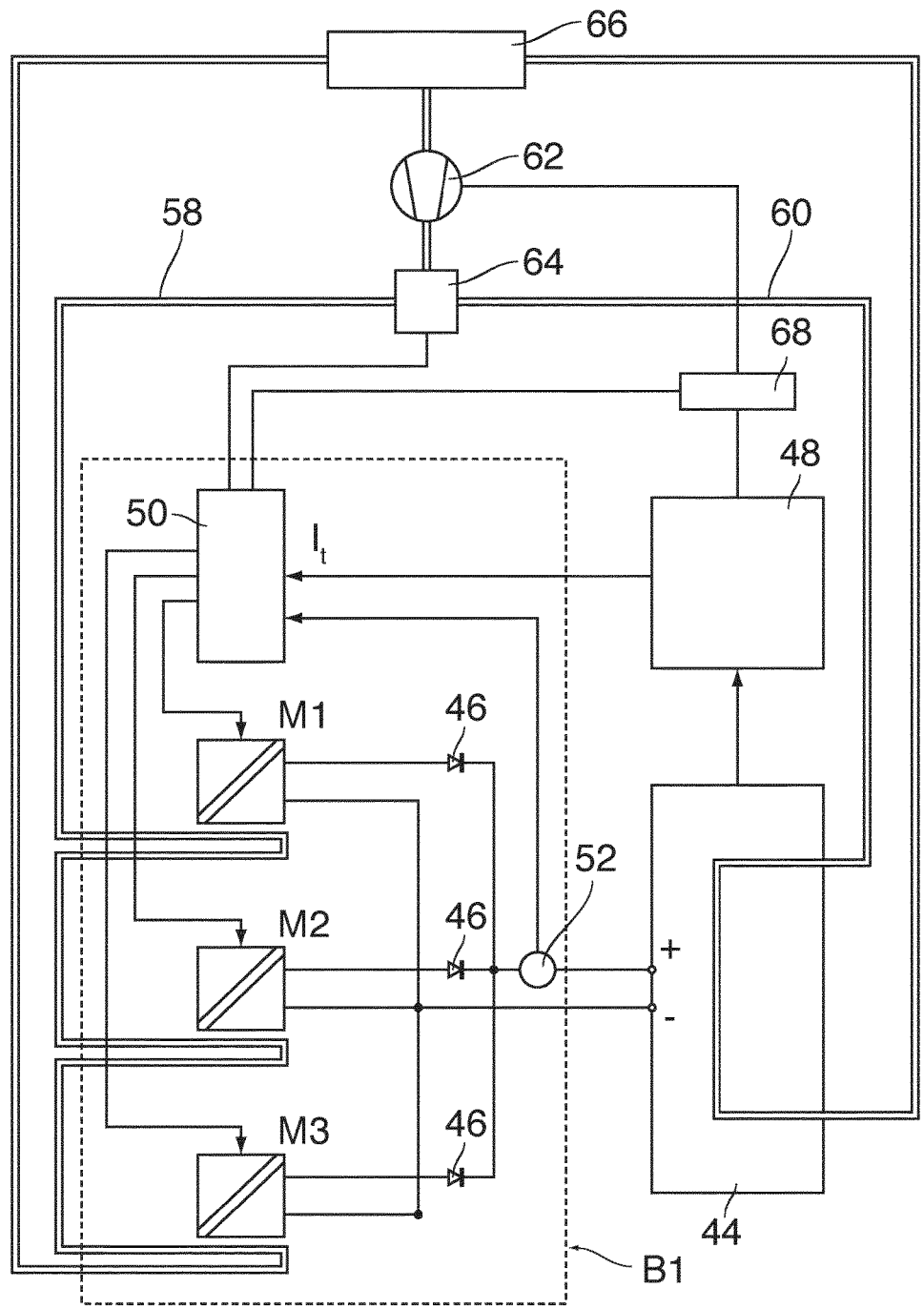
FIG. 7 is a block diagram of a converter unit composed of three converter modules and configured as an on-board battery charger, according to an exemplary embodiment of the present disclosure.

As is shown in FIG. 7, three converter modules M1, M2 and M3, each of which may have the design that has been described above, are connected together to form a converter unit B1 which, in this embodiment, serves as an on-board battery charger for a battery 44 of an electric vehicle. The positive output terminal of each converter module is connected to the anode of a diode 46. The cathodes of all three diodes 46 are commonly connected to the plus terminal of the battery 44. The minus terminal of the battery is connected to the negative output terminals of each of the converters M1, M2, M3. Thus, when all three converter modules are operating, the battery 44 will be charged with a current that is the sum of the output currents of the three converters. The winding ratios of the transformers T in the converter modules M1-M3 are selected such that the output voltages of all modules correspond to the nominal battery voltage.

A battery controller 48 monitors the relevant state parameters of the battery 44, including the charge current, the actual voltage and the temperature of the battery, and controls the battery charge operation by sending a demand signal $I_t$ (representing a target charge current) to a board controller 50 of the converter unit B1. The board controller 50 controls the three converters M1-M3 and, for example, sends a demand signal (corresponding to $I_{out\ setpoint}$ in FIG. 4) to the module controller 18 of each converter module.

A reverse current detector 52 is arranged between the diodes 46 and the battery 44 for detecting a current flowing in reverse direction, i.e. from the battery towards the converter modules, in case of a failure of one of the converters and the associated diode 46. In case of such a reverse current, the board controller 50 will disable all converter modules.

Figure 4:
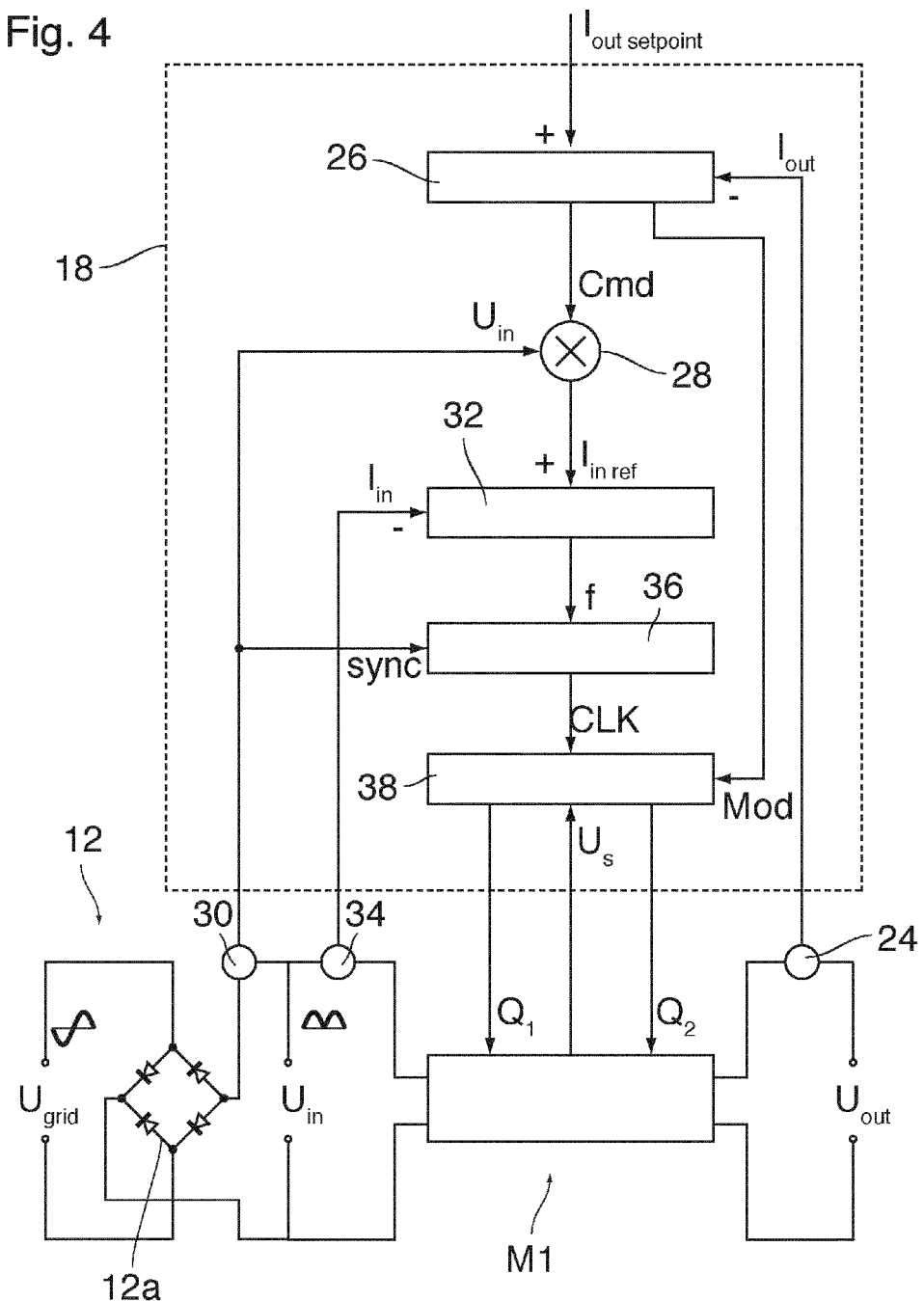
FIG. 4 is a block diagram of a controller for controlling switches of the converter module shown in FIG. 1, according to an exemplary embodiment of the present disclosure.

As an alternative, the reverse current sensor 52 may be replaced by another diode protecting the battery against reverse currents, or reverse current detectors may be provided between the output terminal of each converter and the associated diode 46 (in this case, the function of the reverse current detector could be taken over by the output current detector 24 shown in FIG. 4).

The three converter modules M1-M3 and the board controller 50 of the unit B1 may be formed on a common printed circuit board 54 (FIG. 9) that is mounted on a water cooled base plate 56. In FIG. 7, the water cooling system for the converter unit B1 has been symbolized by a coolant line 58. Another coolant line 60 is provided for cooling the battery 44 (especially when the vehicle is running and the battery is discharged). The coolant lines 58 and 60 are connected to an outlet port of a pump 62 via a two way valve 64. The pump 62 sucks the coolant water from a reservoir 66 into which the water is recirculated via the lines 58, 60. A pump driver 68 is arranged to control the operation of the pump 62 based on command signals received from the board controller 50 and/or the battery controller 48. The board controller 50 further controls the valve 64, so that a sufficient amount of water may be circulated through the coolant line 58 while the battery 44 is charged. When the battery charger is not operating, the valve 64 is switched to a state in which it connects the pump 62 only to the coolant line 60 for the battery.

Figure 8:
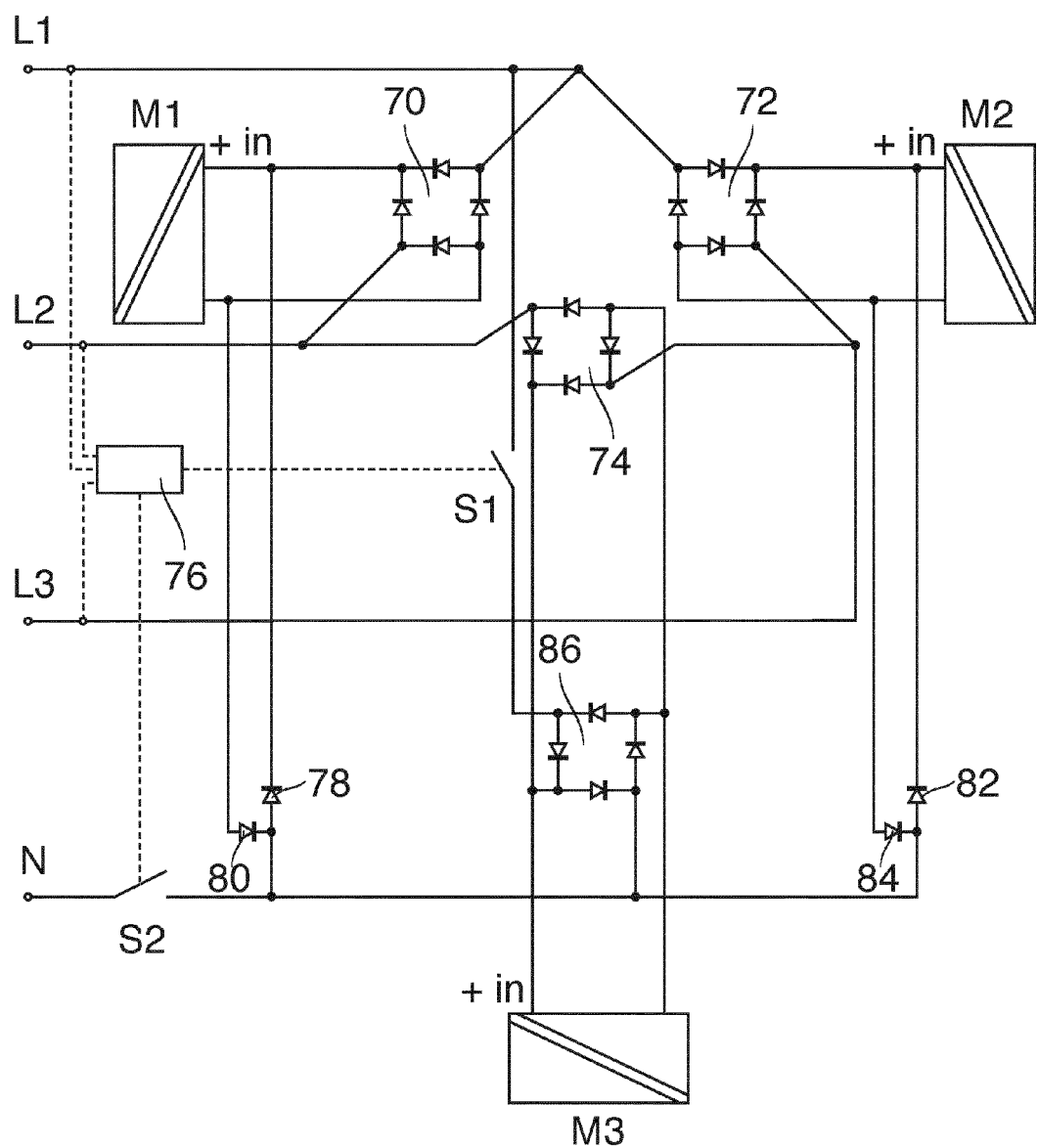
FIG. 8 shows a power supply circuit for the converter modules of the unit shown in FIG. 7, according to an exemplary embodiment of the present disclosure.

FIG. 8 is a circuit diagram for a power supply circuit for the converter unit B1 shown in FIG. 7. When the on-board battery charger is connected to a three-phase mains socket by a suitable plug, the voltages of the three phases will be carried on conductors L1, L2 and L3. These conductors are connected in a triangle configuration to diode full bridges 70, 72 and 74, so that each full bridge will rectify a 400 V phase-against-phase AC voltage and supply the resulting rectified voltage (pulsating DC voltage) to the input side of one of the converters M1, M2 and M3. Since the three input voltages are phase-shifted by 120°, the sum of the output currents of the three converter modules will have only a little amount of ripple, even when the input voltages of the three converter modules are not smoothened by capacitors. In this way, it is possible to suppress the ripple in the battery charge current to a level that is tolerable for the battery.

On the other hand, when the battery charger is connected to a single phase mains socket by a suitable plug, a single phase mains voltage (230 V) will develop between the conductor L1 and a neutral conductor N, whereas conductors L2 and L3 are idle. An input mode selector 76 detects the voltages on the conductors L1, L2 and L3 and when a voltage is detected only on conductor L1, the mode selector closes switches S1 and S2 so as to switch the power supply circuit to a single phase mode. In this mode, the voltage on conductor L1 against the neutral conductor N is rectified for the converter module M1 by two of the diodes of the full bridge 70 and two further diodes 78, 80 (these four diodes forming a full bridge). Similarly, two of the diodes of the full bridge 72 and two further diodes 82, 84 form a rectifier full bridge for the converter module M2. Another diode full bridge 86 rectifies the L1-against-N voltage for the converter module M3. Since, in this case, all three rectifiers are connected in parallel between L1 and N, the ripple in the charge current may be somewhat larger. On the other hand, since the converter modules operate only at 230 V input voltage, the absolute value of the charge current will be smaller, and the absolute value of the ripple will be reduced correspondingly, so that the ripple is still tolerable for the battery.

In a modified embodiment, when no neutral conductor N is available, a so-called virtual star point may be formed by switching series connections of two capacitors with equal capacitance between each pair of mains conductors L1, L2 and L3 and interconnecting the midpoints of the three pairs of capacitors. The voltage between any one of the mains conductors L1-L3 and the virtual star point may then be used for driving the primary side of a transformer that produces an auxiliary voltage for the control circuitry.

Figure 9:
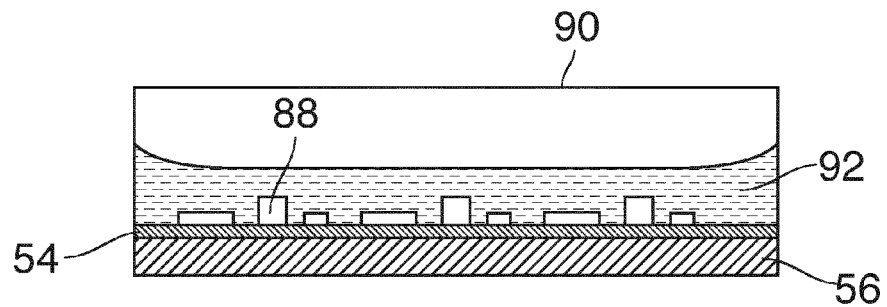
FIG. 9 is a schematic cross-sectional view of the converter unit according to an exemplary embodiment of the present disclosure.

When the converter unit B1 shown in FIGS. 7 and 8 is used as an on-board battery charger, the electronic components and the connections therebetween must be robust enough to withstand the mechanical strains, especially vibrations, which may occur in the vehicle. For this reason, as is shown in FIG. 9, the electronic components 88 of the converter module on the circuit board 54 may be encapsulated in a casing 90 and may be embedded in a potting material 92. As an alternative, mechanical supports may be provided in the casing 90 for stabilizing the components 88.

Figure 10:
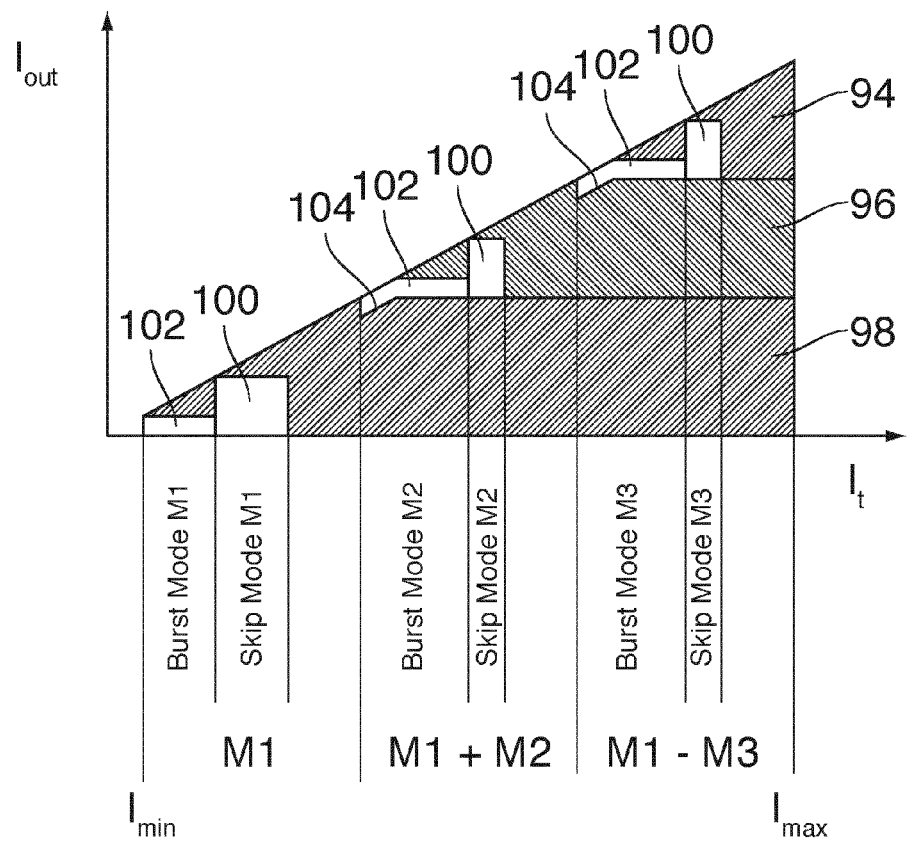
FIG. 10 is a diagram illustrating a method of controlling the output currents of the converter modules of the unit shown in FIGS. 7 to 9, according to an exemplary embodiment of the present disclosure.

In the course of a charge process for the battery 44, the charge current demanded from the converter unit B1 will be set by the battery controller 48 depending on the actual state of the battery. The required charge current, represented by the demand signal $I_t$, may vary in a relatively wide range. In FIG. 10, the total charge current $I_{out}$ and the shares contributed by the individual converter modules M1, M2 and M3 have been shown as a function of the demand signal $I_t$. When the demand signal $I_t$ has its maximum value $I_{max}$, the broad controller 50 will operate all three converter modules M1-M3 at full power, i.e. the switching frequency will be as low as the resonance frequency, so that switching losses are as small as possible.

When the current demand decreases, the switching frequency for module M3 will be increased, so that the output current of this module drops. The share of the total charge current that is provided by module M3 has been indicated in FIG. 10 by a hatched area 94. Meanwhile, modules M1 and M2 still operate at full power as is symbolised by hatched areas 96 and 98.

When the demand signal decreases further and the switching frequency of the module M3 would become too high, this module is switched to the pulse skip mode illustrated in FIG. 5. This is symbolized by an area 100 in FIG. 10. The switching frequency is set back to the resonance frequency and is then gradually increased again so as to respond to a further decreasing demand for current. Optionally, there may be a plurality of pulse skip modes, wherein the ratio of skipped pulses to active pulses increases step-wise so as to further reduce the output current of the module.

When the limit of the skip mode has been reached, the board controller 50 switches the module M3 to the burst mode shown in FIG. 6 and symbolized by an area 102 in FIG. 10. Again, the switching frequency is set back to the resonance frequency and then gradually increased again so as to further decrease the discharge current.

When, with further decreasing demand $I_t$, the switching frequency has reached its maximum, the switching frequency of the module M2 is increased and the current share of the second module M2 is reduced (slope 104 in FIG. 4).

When the current demand has become so low that it can be fulfilled by the two modules M1 and M2 alone, the module M3 is disabled. Both modules will the operate at full power and with highest efficiency.

As the demand signal $I_t$ decreases further, the procedure described above is repeated for the module M2 and finally for the module M1. When the minimum $I_{min}$ of the demand signal $I_t$ is reached, the module M1, the only module that is still operating, is in the burst mode, and the switching frequency has been raised to the maximum.

In this way, the converter unit B1 operates with the highest possible efficiency for any given current demand.

Figure 11:
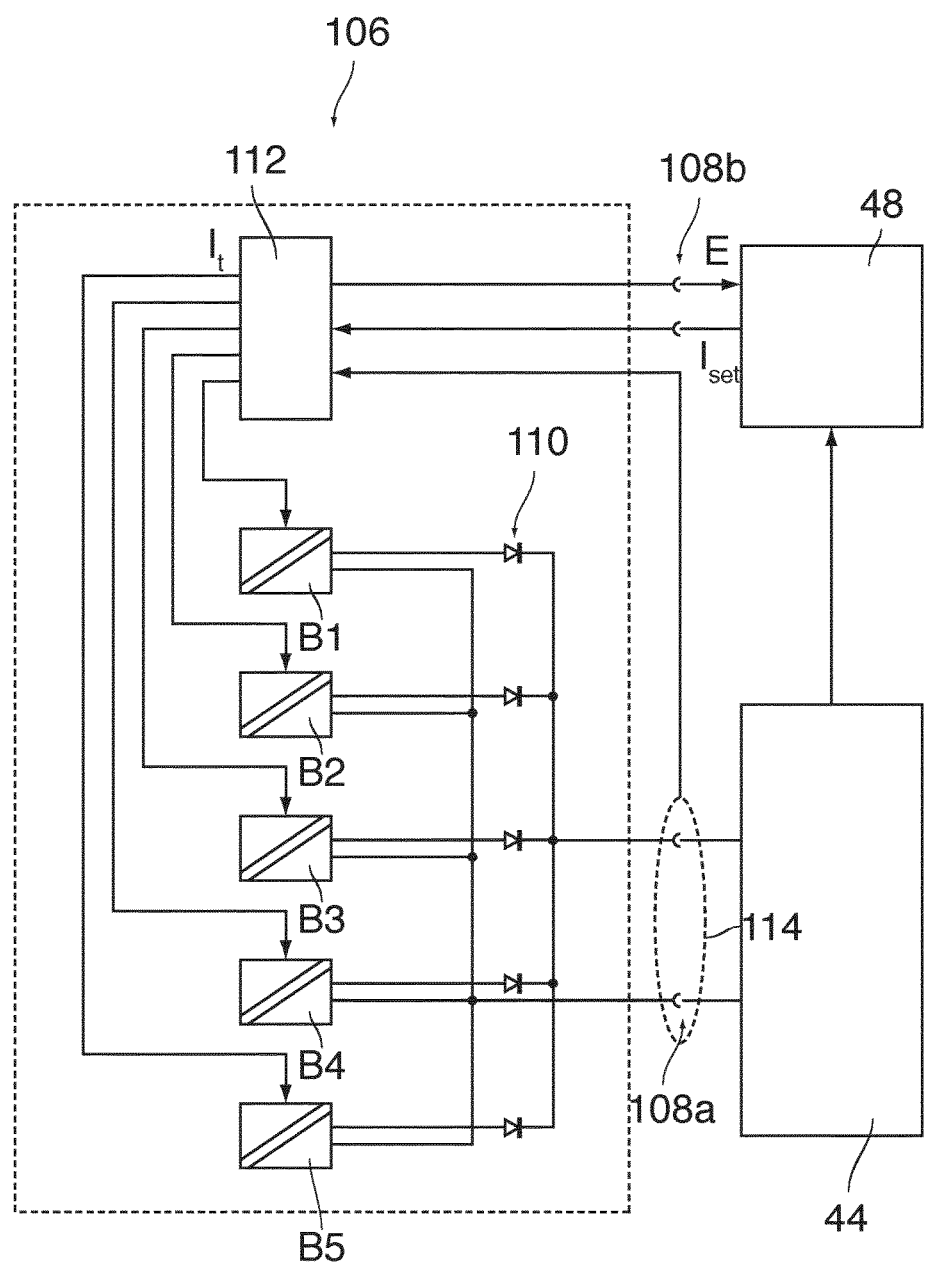
FIG. 11 is a block diagram of a fast charger composed of a plurality of units of the type illustrated in FIGS. 7 to 9, according to an exemplary embodiment of the present disclosure.

As another embodiment example, FIG. 11 shows a battery charger 106 that is configured as a stationary fast charger and is connectable to the vehicle battery 44 and its controller 48 via power and control plug connectors 108*a*, 108*b*.

The battery charger 106 is formed by five converter units B1, B2, B3, B4 and B5 which may each be configured as in FIGS. 7 to 9. The only major difference is that the coolant water system for the base plates 56 is provided in a rack that accommodates the circuit boards 54 of all five units. Further, since the electronic components 88 will not be subject to substantial vibrations, they need not be embedded in potting material.

It will be understood that the fast charger will operate with 400 V three-phase mains voltage supplied to each converter unit on the respective conductors L1, L2 and L3. The mode selectors 76 (FIG. 8) will automatically detect the presence of these voltages, so that the input circuits of all units will automatically adapt to the three-phase mode.

The positive output terminal of each converter unit is connected to the plus terminal of the battery 44 via a diode 110 and a common positive pole of the power plug connector 108*a*, whereas the negative output terminals of the converter units B1-B5 are connected to the minus terminal of the battery 44 via a minus pole of the power plug connector 108*a*. Again, the diodes 110 have the purpose to prevent destructive reverse currents. It will recalled that each converter module of each of the converter units B1-B5 has also its own output diode 46 (FIG. 7), so that redundant diodes 46, 110 are provided for increased safety. Of course, one or more reverse current detectors may also be provided for the battery charger 106.

Figure 12:
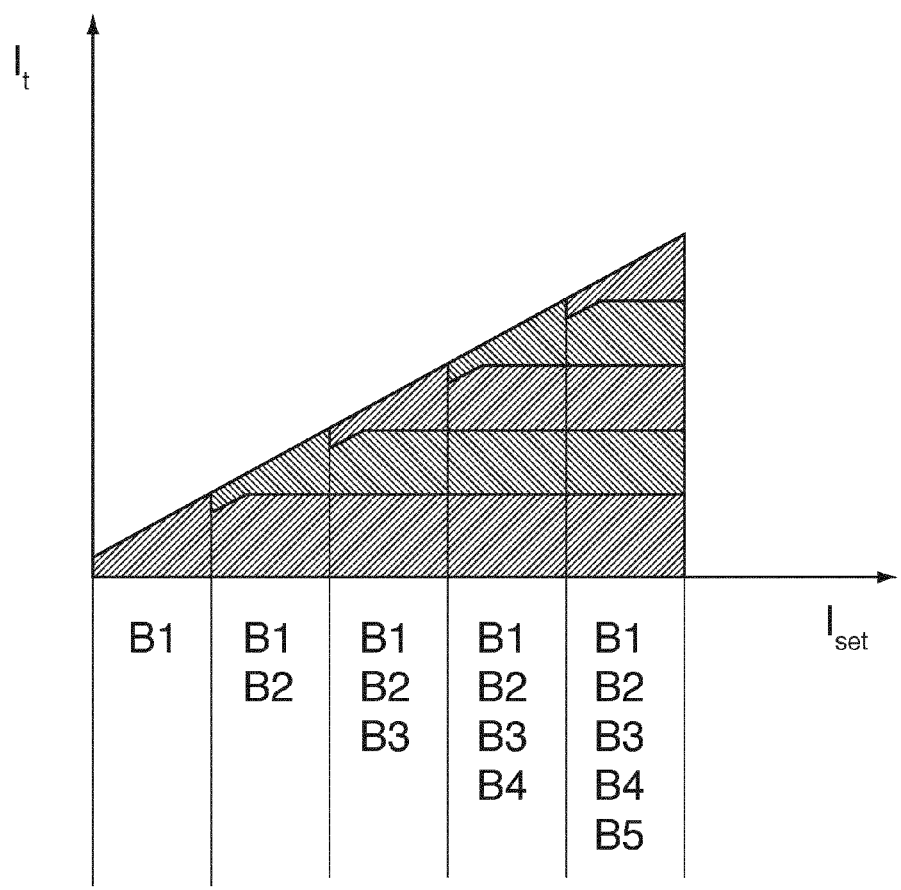
FIG. 12 is a diagram illustrating a method of controlling the output currents of the units composing the fast charger, according to an exemplary embodiment of the present disclosure.

The battery controller 48 on board of the vehicle is connected to a rack controller 112 via the control plug connector 108*b*. The rack controller 112 controls each of the converter units B1-B5. The battery controller 48 sends a demand signal $I_{set}$ to the rack controller 112 which provides the demand signals $I_t$ to each of the converter units. The rack controller 112 determines the shares of the total charge current to be provided by each of the converter units according to a scheme that is similar to the operation scheme of the board controllers 50 (FIG. 10) and has been illustrated in FIG. 12. When the demand signal $I_{set}$ asks for a maximum charge current, all three converter units B1-B5 will be operating at full power, and when the current demand decreases, the units will successively be dimmed and switched off. Since the output current delivered by each individual unit cannot be decreased below a certain limit, there are transition states in which two units operate at reduced power simultaneously, similarly as in FIG. 10. For example, when the output current of the unit B5 cannot be decreased further, the output current of the next unit B4 will be decreased instead. As soon as the demand has become so low that it can be fulfilled with the units B1-B4 alone, the unit B5 is switched off and the unit B4 will operate again at full power.

As is shown in FIG. 11, the power plug connector 108a is supervised by a monitoring circuit 114. It will be understood that the power plug connector 108a must be capable of transmitting charge currents which may become as large as 100 A or more. As a consequence, poor contact at the plug connector 108a could result in dangerous overheating. The monitoring circuit 114 is provided for detecting the occurrence of poor contact at the plug connector. For example, the monitoring circuit 114 may be arranged to measure a voltage drop across the plug connector. As another alternative, the monitoring circuit may detect the temperature in the plug or it may detect RF signals that are induced by chatter or sparks produced in a connector. Whenever the monitoring circuit 114 detects a bad contact condition, the rack controller 112 will disable the charger.

Moreover the rack controller 112 has a self-monitoring function monitoring the operation of all five converter units B1-B5. In case that one of these units should fail, the rack controller 112 would not only switch off this unit but would also send an error signal E to the battery controller 48, informing the battery controller that the charger 106 can only operate at a reduced power.

The battery controller 48 watches the charge current and would abort the charge process when it finds that the actual charge current does not correspond to the demand signal $I_{set}$. Thus, when the demand for charge current cannot be met because one or more of the converter units fail, the battery charge process would be aborted. However, the error signal E is capable of switching the battery charger 48 to a reduced power mode in which $I_{set}$ is small enough to be met by remaining units of the charger. For example, when each of the converter units B1-B5 has a maximum power of 10 kW, and one of the units fails, the error signal E would cause the battery controller 48 to switch from a 50 kW mode to a 40 kW mode, so that the charge process could be continued, though with reduced power.

The same concept is also applicable in case of failure of one of the converter modules M1-M3 in one of the units B1-B5 or in the on-board battery charger.

Figure 13:
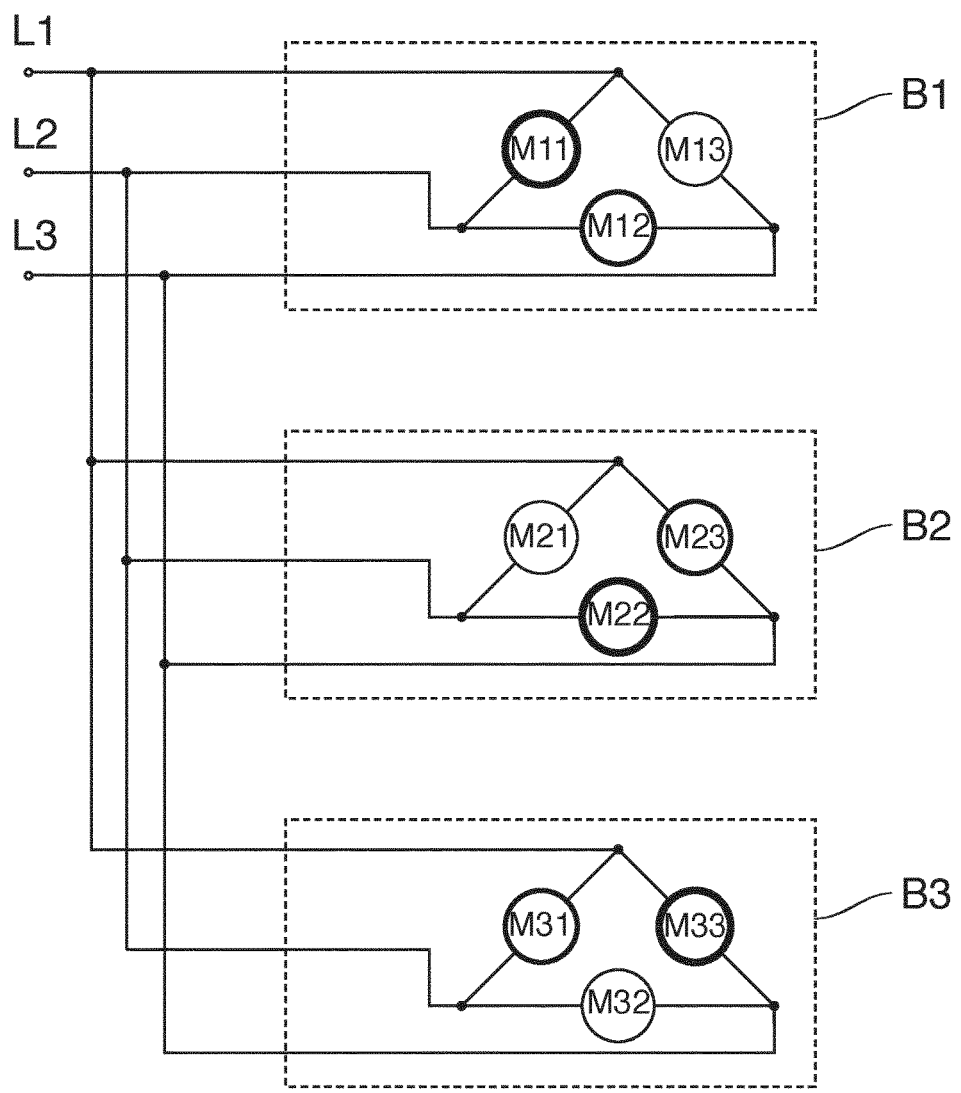
FIG. 13 is a block diagram of a fast charger according to another embodiment, according to an exemplary embodiment of the present disclosure.

FIG. 13 shows an embodiment of a fast charger with three converter units B1-B3. The unit B1 is composed of three modules M11, M12, and M13. The unit B2 is composed of three modules M21, M22, and M23. The unit B3 is composed of three modules M31, M32, and M33.

Figure 14:
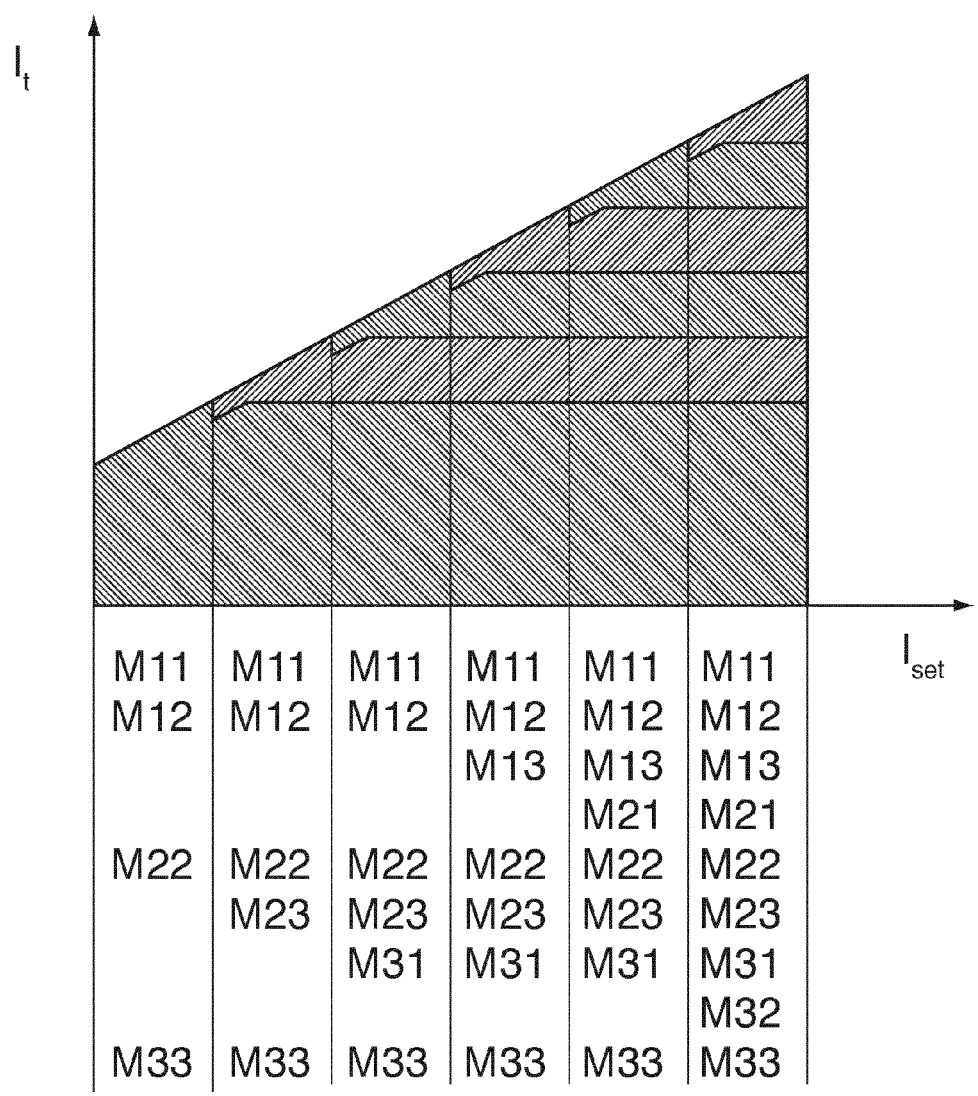
FIG. 14 is a diagram illustrating a method of controlling the output currents of the units composing the fast charger shown in FIG. 13, according to an exemplary embodiment of the present disclosure.

When the demand for current is at maximum, all nine modules are operating at full power. When the demand decreases, the modules are reduced in power output and eventually switched off in the sequence that has been illustrated in FIG. 14. This scheme assures that the power is always distributed approximately evenly over the three units B1, B2 and B3, which results in an efficient utilization of the module cooling capacity in the reduced power modes.

In FIG. 13, the modules M13 (connected between L1 and L3), M21 (connected between L2 and L1), and M32 (connected between L3 and L2) have been shown in faint lines, which symbolizes that these modules are the first to be switched off. It will be noted that, when these three modules have been switched off, the load will be balanced between the three pairs of conductors L1-L3.

The next modules to be disabled will be M12, M23, and M31. When these three modules have also been switched off, the load will again be balanced. In this way, the scheme for disabling individual modules in different ones of the units B1-B3 may be used for controlling the load balance on the mains conductors.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A battery charger for electric vehicles, the battery charger comprising:
   at least one converter unit composed of three converter modules and having a power supply circuit configured to be switched between a three-phase supply mode and a single-phase supply mode;
   wherein the power supply circuit comprises three first bridge circuits by which, in the three-phase supply mode, input sides of the converter modules are connected phase-against-phase in a triangular configuration, and three second bridge circuits by which, in the single phase mode, the input sides of the converter modules are connected phase-against-ground in a star configuration;
   wherein the converter modules comprise identical current controlled DC-DC converter modules having reverse current protected outputs connected in parallel to a charge terminal of a vehicle battery.

2. The battery charger according to claim 1, wherein the power supply circuit comprises a mode selector configured to detect the presence of voltages on mains conductors and to automatically select the supply mode in response to the detected voltages.

3. The battery charger according to claim 1, wherein the converter modules are configured as resonant converters.

4. The battery charger according to claim 3, comprising:
   a controller configured to individually control output currents of the converter modules in accordance with a variable demand signal such that a current demand is met with the smallest possible number of active converter modules, with as many converter modules as possible operating at full power.

5. The battery charger according to claim 1, wherein the battery charger is configured as an on-board battery charger and comprises:
   a controller; and
   a circuit board on which electronic components are mounted and which is supported on a liquid cooled base plate connecting to a coolant system of a vehicle, wherein the controller of the battery charger is adapted to control the liquid coolant system.

6. The battery charger according to claim 1, wherein the battery charger is configured as a stationary charger connectable to the vehicle battery via a power plug connector.

7. The battery charger according to claim 6, comprising: a plurality of the converter units, wherein the outputs of the converter units are connected in parallel to the power plug connector.

8. The battery charger according to claim 7, wherein the three converter modules of each converter unit are respectively connectable phase-against-phase in a triangular configuration, and
   wherein the battery charger comprises a control system having a mode of operation in which at least two converter units are configured to operate at reduced power simultaneously, with at least one converter module in each of these units being disabled.

9. The battery charger according to claim 1, comprising: a monitoring circuit configured to detect a contact condition of a power plug connector; and a controller configured to abort the battery charge process when the monitoring circuit detects a bad contact condition of the power plug connector.

10. The battery charger according to claim 1, comprising: a controller connectable to a battery controller for the vehicle battery and configured to transmit an error signal to the battery controller for switching the battery controller to a reduced power charge mode when at least one of the converter modules fails.

11. A battery charging system for electric vehicles, comprising:
an on-board battery charger according to claim 5, wherein:
the battery charger is configured as a stationary charger connectable to the vehicle battery via a power plug connector; and
the on-board battery charger has the same design as a single module or a single unit of the stationary battery charger.

12. The battery charger according to claim 4, wherein: each converter module has at least two different modes of operation which cover different ranges of output currents; and
the controller is configured to control the converter modules, in response to a change of the demand signal, such that a step-wise change of the output current caused by switching the mode of operation is compensated by changing a switching frequency of the resonant converter, so that the output current becomes a continuous function of the demand signal.

13. The battery charger according to claim 4, wherein the battery charger is configured as an on-board battery charger and comprises:
a circuit board on which electronic components are mounted and which is supported on a liquid cooled base plate connecting to a coolant system of a vehicle, wherein the controller of the battery charger is adapted to control the liquid coolant system.

14. The battery charger according to claim 7, wherein the supply circuit of each converter unit comprises a mode selector configured to detect the presence of voltages on mains conductors and to automatically select a supply mode in response to the detected voltages.

15. The battery charger according to claim 6, comprising: a plurality of the converter units wherein the three converter modules of each converter unit are respectively connectable phase-against-phase in a triangular configuration; and
a control system having a mode of operation in which at least two converter units are configured to operate at reduced power simultaneously, with at least one converter module in each of these units being disabled.

16. The battery charger according to claim 7, comprising: a monitoring circuit configured to detect a contact condition of the power plug connector; and
a controller configured to abort the battery charge process when the monitoring circuit detects a bad contact condition of the plug connector.

17. The battery charger according to claim 8, comprising: a monitoring circuit configured to detect a contact condition of the power plug connector; and
a controller configured to abort the battery charge process when the monitoring circuit detects a bad contact condition of the plug connector.

18. The battery charging system according to claim 11, comprising:
a plurality of the converter units,
wherein the outputs of the converter units are connected in parallel to a power plug connector.

19. The battery charging system according to claim 18, wherein the three converter modules of each converter unit are respectively connectable phase-against-phase in a triangular configuration, and
wherein the battery charger comprises a control system having a mode of operation in which at least two converter units are configured to operate at reduced power simultaneously, with at least one converter module in each of these units being disabled.

20. The battery charging system according to claim 18, comprising:
a monitoring circuit configured to detect a contact condition of the power plug connector; and
a controller configured to abort the battery charge process when the monitoring circuit detects a bad contact condition of the plug connector.

21. The battery charging system according to claim 18, comprising:
a controller connectable to a battery controller for the vehicle battery and configured to transmit an error signal to the battery controller for switching the battery controller to a reduced power charge mode when at least one of the converter modules fails.

22. A battery charger for electric vehicles, the battery charger comprising:
at least three identical current controlled AC-DC converter modules having reverse current protected outputs connected in parallel to a charge terminal of a vehicle battery;
wherein the converter modules are configured as resonant converters;
a controller configured to individually control output currents of the converter modules in accordance with a variable demand signal such that a current demand is met with the smallest possible number of active converter modules, with as many converter modules as possible operating at full power;
wherein each of the converter modules has at least two different modes of operation which cover different ranges of output currents;
wherein the converter modules comprise a power supply circuit configured to be switched between a three-phase supply mode and a single-phase supply mode;
wherein the power supply circuit comprises three first bridge circuits by which, in the three-phase supply mode, input sides of the converter modules are connected phase-against-phase in a triangular configuration, and three second bridge circuits by which, in the single phase mode, the input sides of the converter modules are connected phase-against-ground in a star configuration; and
the controller is configured to control the converter modules, in response to a change of the demand signal, such that a step-wise change of the output current caused by switching the mode of operation is compensated by changing a switching frequency of the resonant converter, so that the output current becomes a continuous function of the demand signal.

* * * * *